United States Patent [19]

Inoue et al.

[11] Patent Number: 5,133,313
[45] Date of Patent: Jul. 28, 1992

[54] BAFFLE PLATE STRUCTURE FITTED TO ENGINE BLOCK

[75] Inventors: Yasushi Inoue, Higashihiroshima; Shigeki Nakatani; Akinobu Aoki, both of Hiroshima, all of Japan

[73] Assignee: Mazda Motor Corporation, Hiroshima, Japan

[21] Appl. No.: 675,615

[22] Filed: Mar. 27, 1991

[30] Foreign Application Priority Data

Mar. 30, 1990 [JP] Japan .................. 2-36987[U]

[51] Int. Cl.⁵ .................................. F02F 7/00
[52] U.S. Cl. .......................... 123/195 C; 123/195 H; 123/196 R; 184/6.5; 184/106; 384/429
[58] Field of Search ........... 123/195 H, 195 C, 196 R; 384/429, 432; 184/6.5, 106

[56] References Cited

U.S. PATENT DOCUMENTS

| | | | |
|---|---|---|---|
| 3,101,129 | 8/1963 | Hulten | 184/106 |
| 4,753,201 | 6/1988 | Fukuo et al. | 123/195 C |
| 4,856,486 | 8/1989 | Mori et al. | 384/429 |
| 4,909,203 | 3/1990 | Fukuo | 184/6.5 |
| 4,911,117 | 3/1990 | Nishimura et al. | 123/195 H |
| 4,911,118 | 3/1990 | Kageyama et al. | 123/195 H |

FOREIGN PATENT DOCUMENTS

| | | | |
|---|---|---|---|
| 88416 | 5/1983 | Japan | 184/6.5 |
| 1328196 | 8/1973 | United Kingdom | 123/195 H |

Primary Examiner—E. Rollins Cross
Assistant Examiner—Weilun Lo
Attorney, Agent, or Firm—Fleit, Jacobson, Cohn, Price, Holman & Stern

[57] ABSTRACT

An engine cylinder block includes lower and upper cylinder block portions which are fastened together by bearing cap fastening bolts and cylinder block fastening bolts. The engine cylinder block is provided with a baffle plate, for separating a crankcase from an oil pan. The baffle plate is fastened to the engine cylinder block by the cylinder block fastening bolts. Bearing cap fastening bolts are arranged in a row parallel to an axis of rotation of the crankshaft at each side of a row of bearing caps. The cylinder block fastening bolts, each of which is located between adjoining bearing caps, are arranged in a row parallel to the axis of rotation of the crankshaft on each side of the row of bearing caps.

5 Claims, 3 Drawing Sheets

BAFFLE PLATE STRUCTURE FITTED TO ENGINE BLOCK

The present invention relates to an oil baffle plate and, more particularly, to a structure for fitting an oil baffle plate to an engine block.

BACKGROUND OF THE INVENTION

1. Field of the Invention

An oil pan is typically provided with a baffle plate, which is used to eliminate entrapment of air in an oil strainer, such as a filtration oil filter, through oil inlets, as well as to prevent oil from sloshing around. Conventionally, the baffle plate is welded to the oil pan, or otherwise secured, together with the oil pan, to an engine block.

2. Description of Related Art

As is known from, for instance, U.S. Pat. No. 4,793,299, entitled "Engine Cylinder Block Reinforcing Structure," issued on Dec. 27, 1988, a reinforcing mechanism may be used to increase the strength of and reinforce skirts which project downward from the cylinder block to which the oil pan is attached. The reinforcing mechanism includes a plate-shaped reinforcing member, spanning and interconnecting portions ranging between a deep portion and a shallow portion of the oil pan, and a plate-shaped stiffening member for providing portions o flanges, integrally formed on lower ends of the skirts, corresponding to the shallow section of the oil pan, with a rigidity higher than that of portions of the flanges corresponding to the deep portion of the oil pan. The reinforcing mechanism is designed to have a weight of approximately 1% to 6% of the weight of cylinder block, and is connected, together with the oil pan, to the engine block. The reinforcing mechanism reinforces the cylinder block without substantially increasing the weight of the engine, and decreases engine vibrations and noises.

The known baffle plate fitting structure, however, if it is welded to the oil pan, tends to undesirably allow air to be admitted into the oil strainer through the oil inlets and be trapped. This is because the baffle plate, welded to the oil pan, must be placed so as not to conceal the oil strainer. Otherwise, if the baffle plate is fit between the oil pan and the cylinder block, the engine will possibly encounter oil leaks.

Known cylinder blocks may be divided into two block portions: an upper block portion, and a lower block portion, integrally formed with skirts and bearing caps, which is bolted to the upper block portion. Such a structure is known from, for instance, Japanese utility model application No. 60-153055, entitled "Engine Body Structure," filed on Oct. 4, 1985, and published as Japanese Unexamined Utility Model Publication No. 62-61960.

Generally, in a cylinder block having a lower cylinder block portion fitted to an upper cylinder block portion, the block portions are connected together by cylinder block portion fastening bolts. A change in an axial fitting or fastening force may be caused between the upper and lower cylinder blocks, due to a change in friction produced between the structural element and bolt heads of the cylinder block portion fastening bolts.

Further, in assembling known cylinder blocks, bearing bores for main bearing journals of a crankshaft are drilled only after the upper and lower cylinder block portions are rigidly fastened to each other by bearing cap fastening bolts and cylinder block fastening bolts. The upper and lower cylinder block portions are then disassembled for crankshaft installation. Thereafter, the upper and lower cylinder blocks, with the crankshaft installed therein, are fastened again by the fastening bolts. If the baffle plate, together with bearing caps of the lower cylinder block, are fastened to the upper cylinder blocks by the bearing cap fastening bolts, the bearing cap fastening bolts apply to the bearing caps a force which is different from the force applied when the bearing bores are drilled. This causes the bearing bore to be misshapen, or out-of-round, and, therefore, produces an insufficient clearance between the bearing bore and the main bearing journal of the crankshaft, which leads to seizing in the bearing.

SUMMARY OF THE INVENTION

A primary object of the present invention is to provide a baffle plate fitting structure in which a baffle plate is fastened to a lower cylinder block portion by fastening bolts without adversely affecting an axial fitting force between the upper and lower cylinder block portions of the cylinder block.

The object of the present invention is accomplished by providing an improved baffle plate fitting structure for fitting a baffle plate to a cylinder block of an engine. The cylinder block comprises an upper cylinder block portion, in which a cylinder of the engine is formed, and a lower cylinder block portion, on which the upper cylinder is mounted, and which is formed with a crankcase, for receiving a crankshaft therein for rotation, divided by a row of bearing caps integrally formed therewith. The lower cylinder block portion is provided with an oil pan attached thereto, and also with a baffle plate attached thereto for separating the crankcase from the oil pan. Each bearing cap of the lower cylinder block portion is fastened by first and second fastening means to the upper cylinder block portion. The second fastening means is located between adjoining bearing caps so as to fasten the baffle plate, as well as the lower cylinder block portion, to the upper cylinder block portion.

The first fastening means comprises fastening bolts. The same number of fastening bolts and bearing caps are provided. The fastening bolts are arranged in a row, and preferably in two parallel rows, parallel to an axis of rotation of the crankshaft on each side of the row of bearing caps. The fastening bolts are further preferably arranged in a row parallel to an axis of rotation of the crankshaft on each side of the row of bearing caps.

The baffle plate is preferably fastened by the fastening bolts used to fasten the lower cylinder block portion to the upper cylinder block portion, each of which is located between adjoining bearing caps. Accordingly, no extra bolts are required for fastening the baffle plate to the lower cylinder block portion. Each cylinder block portion fastening bolt, located between adjoining bearing caps, does not produce any change in clearance between the bearing bore and the main bearing journal of the crankshaft.

BRIEF DESCRIPTION OF THE DRAWINGS

This and other objects and features of the present invention will be apparent to those skilled in the art from the following description of preferred embodiments thereof when considered in conjunction with the accompanying drawings, in which similar reference numerals have been used to designate the same or similar elements throughout the drawings, and wherein.

DETAILED DESCRIPTION OF THE PREFERRED EMBODIMENT

Figure 1:
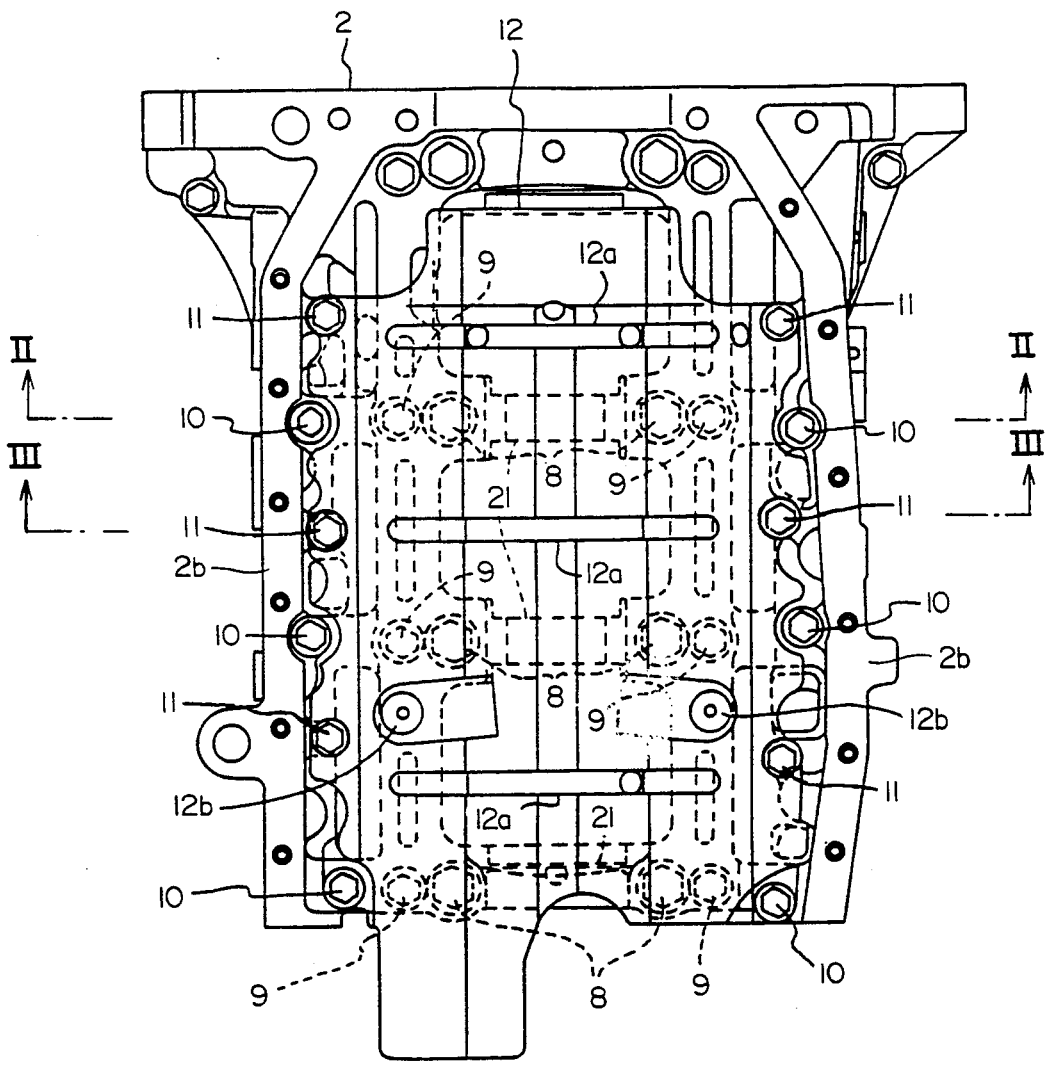
FIG. 1 is a bottom view of a cylinder block of a V-type overhead camshaft engine having a baffle plate fitting structure in accordance with a preferred embodiment of the present invention.

Referring now to FIGS. 1 to 4 in detail, a V-type, six-cylinder internal combustion engine with its cylinder head removed and with a baffle plate fitted thereto in accordance with a preferred embodiment of the present invention is shown. The engine has a cylinder block 1, consisting of an upper cylinder block portion 3 and a lower cylinder block portion 2 fastened by fastening bolts 10 and 11 to the upper cylinder block portion 3. The cylinder block 1 comprises left and right cylinder banks 1L and 1R, arranged in a V-formation and at a predetermined relative angle of, for example, 60 degrees. Three cylinders 4L (only one of which is shown) are formed in the left cylinder bank 1L, and three cylinders 4R (only one of which is shown) are formed in the right cylinder bank 1R. The cylinders 4L and 4R in the left and right cylinder banks 1L and 1R are each arranged in rows parallel to an axis of rotation of a crankshaft 7. Left and right cylinder heads (not shown) are mounted on the upper cylinder block portion 3, and provide for the left and right cylinder banks 1L and 1R, respectively. Upper cylinder block 3 is provided with cylinder bores 4La and 4Ra, in which pistons 5 can slide.

The lower cylinder block 2 is formed with a crankcase 2a, in which the crankshaft 7, including main bearing journals 7a and counterbalances 7b, rotate. The crankshaft 7 is connected, by connecting rods 6, to the pistons 5. Reciprocating motion of the pistons is changed by crankshaft 7 to a rotary motion in order to drive wheels of the vehicle. An oil pan 15, forming therein an oil sump 15a, is fastened, at several points, by fastening bolts 15b to skirts 2b of the lower cylinder block 2. Located in the oil pan 15 is an oil strainer 16, having an oil inlet 16a opening downward. The oil strainer 16 is suspended in oil pan 15 by a bracket 16b fixed to the under surface of the lower cylinder block portion 2 by reinforcing bolts 9. The oil strainer 16 is connected to an oil pump (not shown). The lower cylinder block portion 2 is fastened to the upper cylinder block portion 3 by main fastening bolts 8, by fastening bolts 10 and 11, which will be described later, and by the reinforcing bolts 9.

Figure 2:
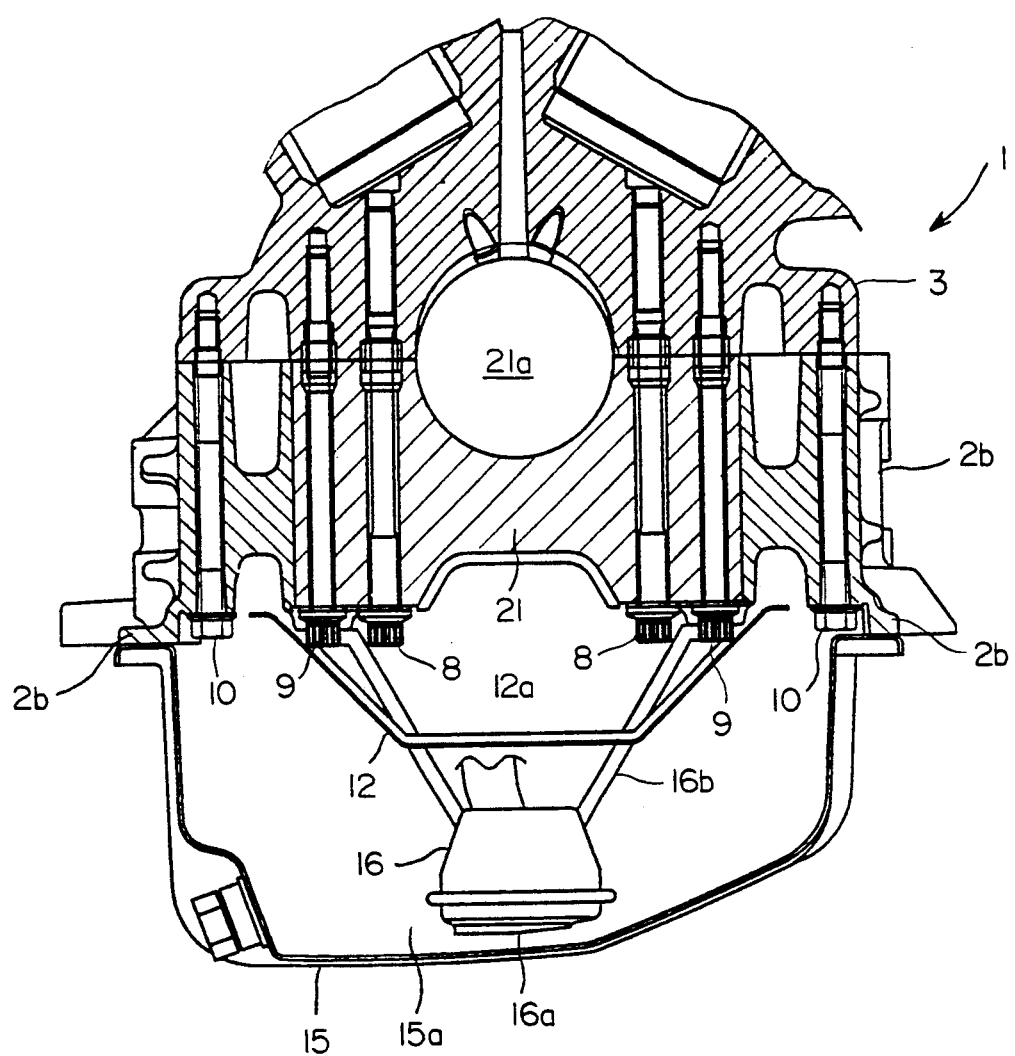
FIG. 2 is a cross-sectional view of FIG. 1 as seen along section line II—II.
Figure 3:
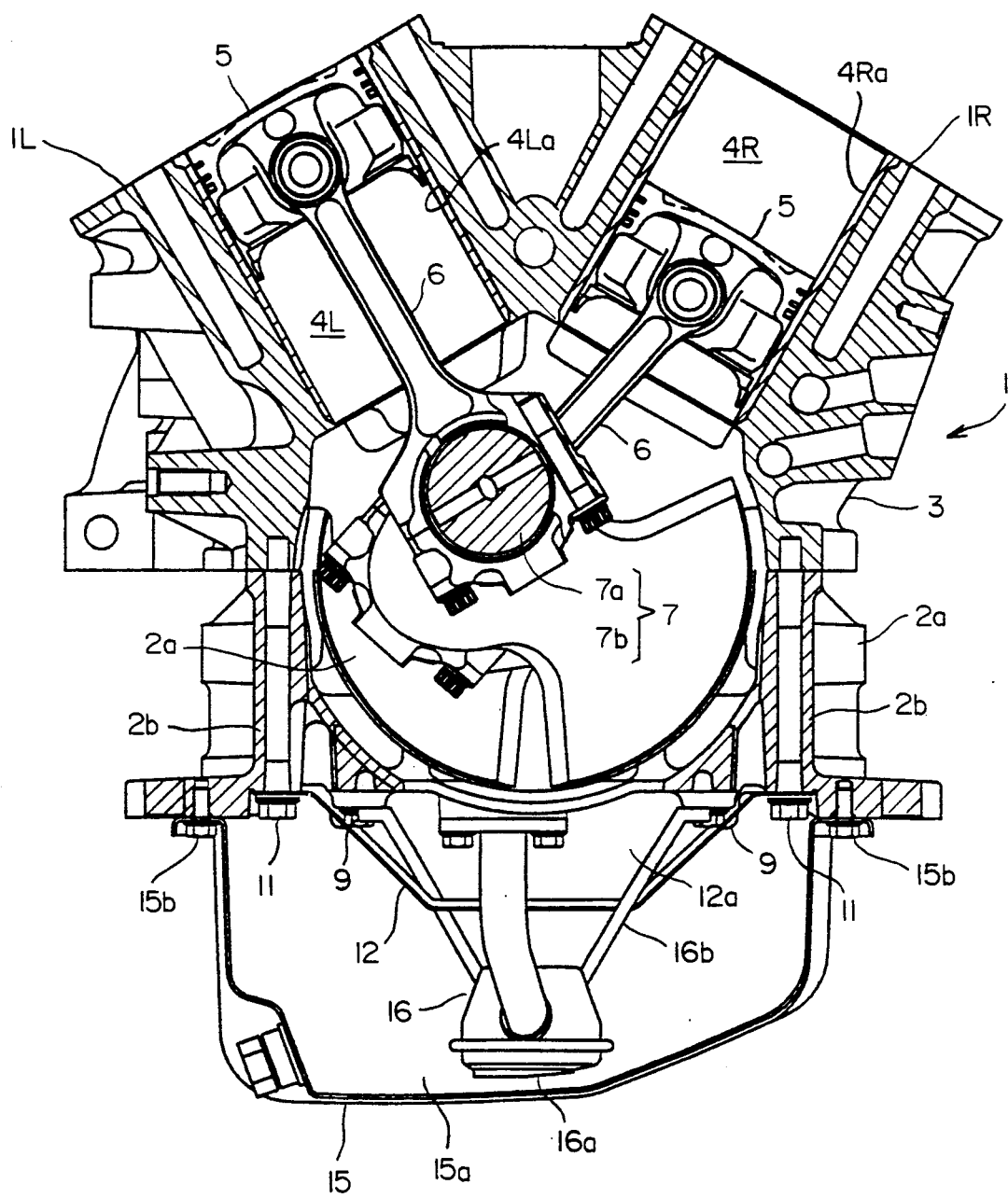
FIG. 3 is a cross-sectional view of FIG. 1 as seen along section line III—III.

As is shown in FIG. 2, bearing caps 21 are integrally formed with the lower cylinder block portion 2. The bearing caps 21 support the crankshaft 5 for rotation, and are fastened by the main fastening bolts 8 and reinforcing bolts 9 to the under surface of the upper cylinder block portion 3. The fastening bolts 10, fastening the lower cylinder block portion 2 to the upper cylinder block portion 3, are arranged in rows substantially parallel to the crankshaft 7, and are located on both sides of the bearing caps 21, respectively. The fastening bolts 11 are arranged along the skirts 2b of the lower cylinder block portion in rows parallel to the rows of main fastening blots 10, and are located between adjoining bearing caps 21. A baffle plate 12 is fastened, by the fastening bolts 11, to the under surface of the lower cylinder block 2. This baffle plate 12 is sized to cover almost the entire area of the under surface of the lower cylinder block 2 so as to separate the crankcase 2a of the lower cylinder block 2 from the oil sump 15a of the oil pan 15. The baffle plate 12 is bent, and projects downwardly to form a space 12a thereabove which extends in the axial direction of the crankshaft 7 so as to allow the crankshaft 7, including the main bearing journals 7a and counterbalances 7b, to rotate without any interference.

Typically, when a vehicle including an engine having a cylinder block as described above climbs or descends a hill, brakes to a quick stop, or makes a quick turn, waves or undulations are produced in the oil in the oil pan 15. In addition, the crankshaft 7, during rotation, agitates the oil in the oil pan 15. This can produce air bubbles in the oil pan 15. However, in an engine block such as engine block 1 described above, the baffle plate 12 prevents the oil from becoming undulated, so that the oil inlet 16a of the oil strainer 16 does not emerge from the oil in the oil pan 15. Also, the agitation of oil produced by the crankshaft 7 is the crankcase 2a is prevented from being transmitted to the oil in the oil pan 15. Moreover, the baffle plate 12 eventually functions to prevent the oil strainer 16 from drawing air through the oil inlet 16a.

The structural rigidity of the baffle plate 12 is reinforced by a plurality of, for instance three, in the illustrated embodiment, generally U-shaped ribs 12a, which project toward the bottom of the lower cylinder block portion 2. The baffle plate 12 is formed with a pair of mounts 12b, through which the brackets 16b of the oil strainer 16 are fastened to the lower cylinder block 2.

In assembling the cylinder block after rigidly fastening the lower cylinder block portion 2 to the upper cylinder block portion 3 by the fastening bolts 8 and 10 and the reinforcing bolts 9, all of the bearing bores 21a for the main bearing journals 7a of the crankshaft 7 are drilled. The lower cylinder block portion 2 is then disassembled from the upper cylinder block portion 3. After installing the crankshaft 7 in the upper cylinder block 3, the lower cylinder block 2 is fastened once again to the upper cylinder block portion 3 by the fastening bolts 8 and 10 and the reinforcing bolts 9 to assemble the cylinder block 1. In order to prevent the bearing bores 21a from being differently affected by the bolts 8, 9 and 10 once the bearing bores are drilled, it is desired to fasten the bolts located closer to the bearing bores 21a first. The baffle plate 12 is then fastened, by the fastening bolts 11, to the lower cylinder block portion 2. Because the fastening bolts 11 are located between the bearing caps 21, they do not adversely affect the bearing caps 21 fastened by the bolts 8, 9 and 10, and no change in clearance is produced between the bearing bore 21a and the main bearing journal 7a of the crankshaft 7. Finally, the oil pan 15 is secured by set screws 19 to the skirts 2b of the lower cylinder block portion 2.

Because the baffle plate 12 is fastened by the fastening bolts 11, which are necessary to fasten the lower cylinder block portion 2 to the upper cylinder block portion 3 and arranged between the bearing caps 21, extra bolts are not required to fasten the baffle plate 12 to the lower cylinder block portion 2 of the cylinder block 1. Furthermore, because the baffle plate 12 is fastened to the lower cylinder block portion 2 after installing the crankshaft 7 and assembling the upper and lower cylinder block portions 2 and 3, the assembling process of the cylinder block 1 is improved.

It is to be understood that although the present invention has been described in detail with respect to a preferred embodiment thereof, various other embodiments and variants are possible which fall within the scope and spirit of the invention, and such embodiments and variants are intended to be covered by the following claims.

What is claimed is:

1. In combination, a baffle plate fitting structure and a cylinder block of an engine with an oil pan including an upper cylinder block portion, in which a cylinder of the engine is formed, and a lower cylinder block portion, on which the upper cylinder portion is mounted and which is formed with a crankcase, for receiving a crankshaft therein for rotation, divided by a row of bearing caps integrally formed therewith, said baffle plate fitting structure comprising:

first fastening means for fastening each of said bearing caps to said upper cylinder block portion;

second fastening means located between adjoining bearing caps for fastening said lower cylinder block portion to said upper cylinder block portion; and a baffle plate secured by said second fastening means to said lower cylinder block portion for separating said crankcase from said oil pan.

2. A baffle plate fitting structure as defined in claim 1, wherein said first fastening means comprises bolts, as many of said bolts being provided as there are of said bearing caps, said bolts being arranged, in a row parallel to an axis of rotation of said crankshaft, on each side of said row of bearing caps.

3. A baffle plate fitting structure as defined in claim 1, wherein said first fastening means comprises bolts, as many of said bolts being provided as there are of said bearing caps, said bolts being arranged, in two rows parallel to an axis of rotation of said crankshaft, on each side of said row of bearing caps.

4. A baffle plate fitting structure as defined in claim 1, wherein said second fastening means comprises a plurality of bolts arranged in a row parallel to an axis of rotation of said crankshaft on each side of said row of bearing caps.

5. A baffle plate fitting structure as defined in claim wherein said baffle plate is formed into a generally bent, downwardly projecting shape and extends to cover substantially an entire opening area of said crankcase.

* * * * *